US008798907B2

(12) United States Patent
Shida

(10) Patent No.: US 8,798,907 B2
(45) Date of Patent: Aug. 5, 2014

(54) ON-VEHICLE APPARATUS, PRECEDING VEHICLE POSITION DETERMINING APPARATUS, AND PRECEDING VEHICLE POSITION DETERMINING METHOD

(75) Inventor: Mitsuhisa Shida, Fuji (JP)

(73) Assignee: Toyota Jidosha Kabushiki Kaisha, Toyota (JP)

(\*) Notice: Subject to any disclaimer, the term of this patent is extended or adjusted under 35 U.S.C. 154(b) by 0 days.

(21) Appl. No.: 13/639,744

(22) PCT Filed: Mar. 29, 2011

(86) PCT No.: PCT/IB2011/000661
§ 371 (c)(1),
(2), (4) Date: Oct. 5, 2012

(87) PCT Pub. No.: WO2011/128739
PCT Pub. Date: Oct. 20, 2011

(65) Prior Publication Data
US 2013/0030687 A1 Jan. 31, 2013

(30) Foreign Application Priority Data
Apr. 12, 2010 (JP) ................. 2010-091714

(51) Int. Cl.
*G08G 1/16* (2006.01)
*G01S 5/00* (2006.01)
*G01S 7/41* (2006.01)
(52) U.S. Cl.
CPC .......... *G01S 5/0072* (2013.01); *G01S 7/41* (2013.01); *G08G 1/163* (2013.01)
USPC ........................................ 701/301

(58) Field of Classification Search
USPC .................................................. 701/22, 301
See application file for complete search history.

(56) References Cited

U.S. PATENT DOCUMENTS

| 6,370,475 | B1* | 4/2002 | Breed et al. | 701/301 |
|---|---|---|---|---|
| 6,405,132 | B1* | 6/2002 | Breed et al. | 701/301 |
| 6,720,920 | B2* | 4/2004 | Breed et al. | 342/386 |
| 7,110,880 | B2* | 9/2006 | Breed et al. | 701/482 |
| 7,202,776 | B2* | 4/2007 | Breed | 340/435 |
| 7,224,308 | B2* | 5/2007 | Butler et al. | 342/45 |
| 7,295,925 | B2* | 11/2007 | Breed et al. | 701/301 |
| 7,418,346 | B2* | 8/2008 | Breed et al. | 701/301 |

(Continued)

FOREIGN PATENT DOCUMENTS

| DE | 10 2008 012 655 A1 | 12/2008 |
|---|---|---|
| JP | A-2002-222491 | 8/2002 |

(Continued)

*Primary Examiner* — Calvin Cheung
*Assistant Examiner* — Allen E Quillen
(74) *Attorney, Agent, or Firm* — Oliff PLC

(57) ABSTRACT

An ECU acquires relative position information related to a relative position between a host vehicle and another vehicle (A, B, C) traveling ahead of the host vehicle, and error information related to an error in the relative position, detects the position of a preceding vehicle (A) traveling in front of the host vehicle, identifies the position of the preceding vehicle (A) by comparing the relative position based on the acquired relative position information with the detected position, and if relative position information oh a plurality of other vehicles (A, B, C) is acquired, identifies the position of the preceding vehicle (A) by comparing the relative position based on the acquired relative position information with the detected position, by using a threshold that is varied in accordance with the error information.

5 Claims, 3 Drawing Sheets

(56) References Cited

U.S. PATENT DOCUMENTS

| | | | |
|---|---|---|---|
| 7,426,437 B2 * | 9/2008 | Breed et al. | 701/301 |
| 7,561,961 B2 * | 7/2009 | Wakamatsu et al. | 701/469 |
| 7,610,146 B2 * | 10/2009 | Breed | 701/514 |
| 7,629,899 B2 * | 12/2009 | Breed | 340/903 |
| 7,729,857 B2 * | 6/2010 | Mudalige et al. | 701/301 |
| 7,804,423 B2 * | 9/2010 | Mudalige et al. | 340/902 |
| 7,840,355 B2 * | 11/2010 | Breed et al. | 701/301 |
| 7,899,621 B2 * | 3/2011 | Breed et al. | 701/301 |
| 7,920,969 B2 * | 4/2011 | Mudalige et al. | 701/301 |
| 7,979,173 B2 * | 7/2011 | Breed | 701/23 |
| 7,983,836 B2 * | 7/2011 | Breed | 701/117 |
| 7,983,842 B2 * | 7/2011 | Tanino et al. | 701/507 |
| 8,050,686 B1 * | 11/2011 | Souissi et al. | 455/456.1 |
| 8,199,028 B2 * | 6/2012 | Mudalige | 340/905 |
| 8,306,735 B2 * | 11/2012 | Mudalige et al. | 701/409 |
| 8,314,718 B2 * | 11/2012 | Muthaiah et al. | 340/903 |
| 8,352,111 B2 * | 1/2013 | Mudalige | 701/24 |
| 8,352,112 B2 * | 1/2013 | Mudalige | 701/24 |
| 2006/0155428 A1 | 7/2006 | Imai | |
| 2008/0147253 A1 * | 6/2008 | Breed | 701/3 |
| 2008/0154629 A1 * | 6/2008 | Breed et al. | 705/1 |
| 2009/0043506 A1 * | 2/2009 | Breed | 701/214 |
| 2009/0237293 A1 | 9/2009 | Sakuma | |
| 2009/0271112 A1 * | 10/2009 | Basnayake | 701/213 |
| 2010/0164701 A1 * | 7/2010 | Bargman et al. | 340/436 |
| 2010/0164789 A1 * | 7/2010 | Basnayake | 342/357.04 |
| 2010/0202495 A1 * | 8/2010 | Kagawa et al. | 375/142 |
| 2010/0256836 A1 * | 10/2010 | Mudalige | 701/2 |
| 2011/0190972 A1 * | 8/2011 | Timmons et al. | 701/29 |
| 2012/0271540 A1 * | 10/2012 | Miksa et al. | 701/409 |

FOREIGN PATENT DOCUMENTS

| | | |
|---|---|---|
| JP | A-2005-005978 | 1/2005 |
| JP | A-2007-280060 | 10/2007 |
| WO | WO 2005/006275 A1 | 1/2005 |

* cited by examiner

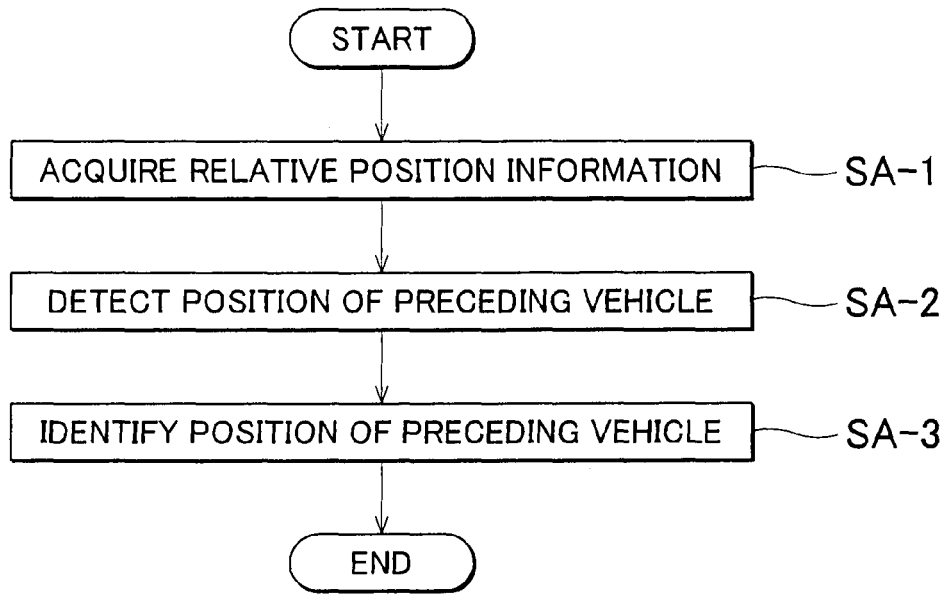
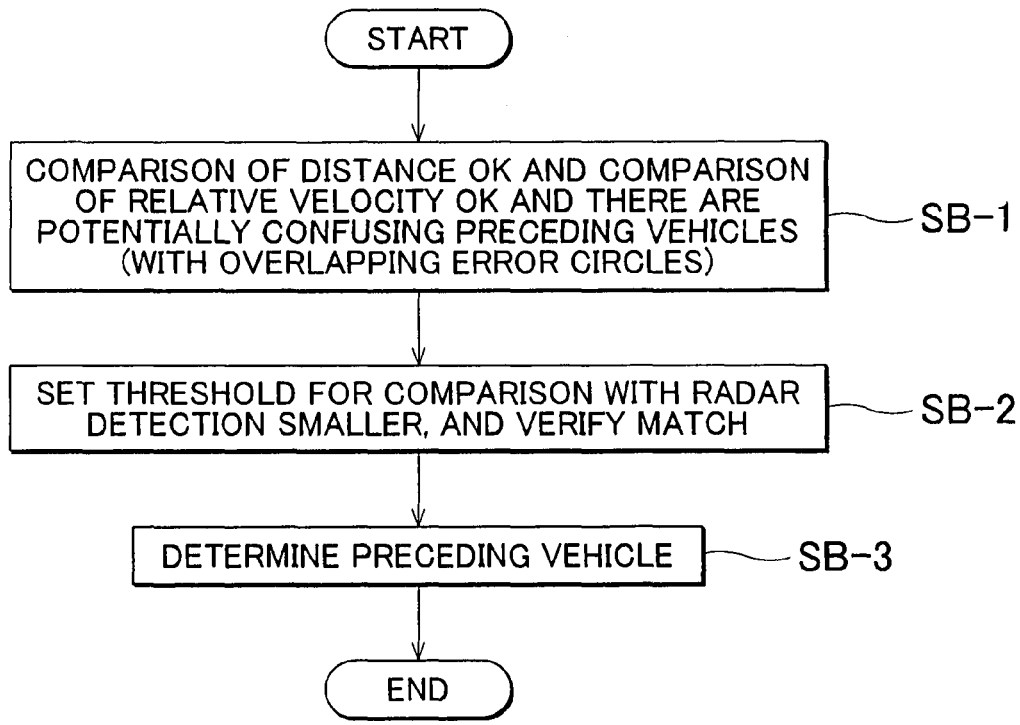

ON-VEHICLE APPARATUS, PRECEDING VEHICLE POSITION DETERMINING APPARATUS, AND PRECEDING VEHICLE POSITION DETERMINING METHOD

BACKGROUND OF THE INVENTION

1. Field of the Invention

The present invention relates to an on-vehicle apparatus, a preceding vehicle position determining apparatus, and a preceding vehicle position determining method.

2. Description of the Related Art

In the related art, techniques that identify the positions of objects around a host vehicle have been developed.

For example, Japanese Patent Application Publication No. 2002-222491 (JP-A-2002-222491) describes a technique that recognizes a preceding automobile in the vicinity of an automobile (following automobile) which is present closest to the automobile by a global positioning system (GPS). Also, in the described technique, the host vehicle may be equipped with a following distance measurement device to measure the actual following distance to the preceding vehicle using a laser radar or ultrasonic waves. Then, in the described technique, if the distance between the host vehicle and the preceding vehicle identified by the GPS, and the actual following distance measured by the following distance measurement device substantially match, the vehicle identified by the GPS' and the vehicle recognized by the following distance measurement device are determined to be identical.

Also, for example, Japanese Patent Application Publication No. 2005-5978 (JP-A-2005-5978) describes a technique that measures information on distance and position by an adaptive cruise control (ACC) radar, a GPS, and the like, and obtains information on distance, position, and the like directly from a vehicle that is the other communicating party by an inter-vehicle communication device. Then, in the described technique, by combining these pieces of information with image data around a host vehicle, moving objects that are present in the surroundings are recognized more quickly and more accurately than analysis using only image data. Also, in the described technique, when a plurality of moving objects is present in the vicinity of the host vehicle, this combined process is executed for each of the objects. Furthermore, in the described technique, when the inter-vehicle communication device is unable to detect all the moving objects in the vicinity of the host vehicle within a predetermined period of time due to traffic congestion or human congestion, the range of distance within which the inter-vehicle communication device communicates with moving objects (vehicles, humans, and so on) is set short, thereby narrowing down the number of moving objects to be detected so as to be able to complete communication within a preset time.

Also, for example, Domestic Re-publication of PCT International Application No. WO2005/006275 describes a technique that discriminates a plurality of nearby moving objects by transmitting a travel state including an operational command received by each moving object, together with identification information for the object, and monitoring the behaviors of other moving objects. Also, in the described technique, at least one of the plurality of moving objects is taken as a target, the target is caused to perform a self-indicating action that allows its behavior to be differentiated from other moving objects, and as the other moving objects detect this self-indicating action, the relative position of the target is grasped, thereby discriminating the plurality of moving objects that are present in the surroundings.

However, the control method described in JP-A-2002-222491 is susceptible to error because the traffic density around the vehicle is not taken into consideration when identifying the preceding vehicle.

However, because the surrounding environment recognition system described in JP-A-2005-5978 is configured to obtain information on distance, position, and the like through direct communication with another vehicle equipped with the inter-vehicle communication device, the system is unable to accurately identify the position of a vehicle that is not equipped with the inter-vehicle communication device.

Also, the moving object discrimination method described in WO2005/006275 has a problem that this method cannot be used in situations where the moving object taken as a target is unable to perform such a self-indicating action that allows the moving object to be significantly differentiated from other moving objects. Also, this identification method has a problem in that because it is necessary for other moving objects to respond to and detect the self-indicating action of the target, the method cannot be applied to moving objects that are not equipped with a detection device.

SUMMARY OF THE INVENTION

The present invention provides an on-vehicle apparatus, a preceding vehicle position determining apparatus, and a preceding vehicle position determining method, with which when identifying a preceding vehicle by comparing positional information such as relative distance and relative velocity based on a GPS, with positional information based on an autonomous sensor, if a plurality of other vehicles are present, a threshold for comparison is varied in accordance with an error in the GPS-based positional information, thereby making it possible to identify the preceding vehicle more precisely.

A first aspect of the present invention relates to an on-vehicle apparatus, which recognizes a positional relationship between another vehicle and a host vehicle on the basis of a detection result of a position of the other vehicle by an object sensor, and positional information on the other vehicle acquired by communication, in which a determination condition for recognition of the positional relationship is changed on the basis of reliability of the positional information on the other vehicle acquired by communication.

In the first aspect of the present invention, recognition of the positional relationship may be associating the other vehicle whose position is detected by the object sensor, with the other vehicle whose positional information is acquired by communication.

Also, the on-vehicle apparatus may be applied to adaptive cruise control, if the object sensor is abnormal, even if communication is normal, the adaptive cruise control based on a result of recognition of the positional relationship may be continued, and if the object sensor is normal, and an abnormality in communication continues, the adaptive cruise control may be stopped.

Also, the object sensor may include at least one object sensor selected from the group consisting of a millimeter-wave radar, a laser radar, a camera, an ultra wide band radar, and a sonar.

A second aspect of the present invention relates to a preceding vehicle position determining apparatus that includes relative position information acquiring means for acquiring relative position information related to a relative position between a host vehicle and another vehicle that is traveling ahead of the host vehicle, and error information related to an error in the relative position, preceding vehicle detecting means for detecting a position of a preceding vehicle that is traveling in front of the host vehicle, and preceding vehicle identifying means for identifying the position of the preceding vehicle, by comparing the relative position based on the relative position information acquired by the relative position information acquiring means, with the position detected by the preceding vehicle position detecting means, in which if the relative position information on a plurality of the vehicles is acquired by the relative position information acquiring means, the preceding vehicle identifying means identifies the position of the preceding vehicle by comparing the relative position based on the relative position information acquired by the relative position information acquiring means, with the position detected by the preceding vehicle detecting means, by using a threshold varied in accordance with the error information.

The preceding vehicle position determining apparatus may set the threshold so as to become smaller as the error based on the error information becomes larger.

A third aspect of the present invention relates to a preceding vehicle position determining method. The preceding position determining method includes: acquiring relative position information related to a relative position between a host vehicle and another vehicle that is traveling ahead of the host vehicle, and error information related to an error in the relative position, by using communication means; detecting a position of a preceding vehicle that is traveling in front of the host vehicle, by using an object sensor; determining whether or not the relative position information is acquired from a plurality of the vehicles; identifying the position of the preceding vehicle by comparing the relative position based on the relative position information with the position, by using a predetermined threshold, if the relative position information on a singularity of the vehicle is acquired; and identifying the position of the preceding vehicle by comparing the relative position based on the relative position information with the position, by using a threshold varied in accordance with the error information, if the relative position information on the plurality of the vehicles is acquired.

According to the present invention, when recognizing a preceding vehicle by comparing the relative position of each preceding vehicle traveling ahead of a host vehicle which is detected by a GPS, with the position of the preceding vehicle detected by the autonomous sensor such as a radar equipped to the host vehicle, a comparison threshold can be varied in accordance with how likely neighboring vehicles are erroneously recognized. That is, according to the present invention, by setting the threshold for comparison with the position of the preceding vehicle detected by the autonomous sensor smaller in accordance with the degree of overlap of error ranges to be tolerated in acquisition of the relative position of neighboring vehicles (for example, the area of the overlapping portion of error circles), the preceding vehicle can be identified more precisely.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIG. 1 is a flowchart that illustrates the basic operating principle of this embodiment;

FIG. 2 is a flowchart that illustrates an example of a preceding vehicle identification process according to this embodiment;

DETAILED DESCRIPTION OF EMBODIMENTS

An embodiment of a preceding vehicle position determining apparatus according to the present invention will be described in detail with reference to the drawings. It is to be understood that this invention is not restricted to the particulars of the described embodiment.

An overview of an embodiment of the present invention will be described with reference to FIGS. 1 to 3, and then the configuration, operation, and the like of the embodiment will be described in detail. FIG. 1 is a flowchart that illustrates the basic operating principle of the embodiment.

The present invention generally includes the following basic features. Specifically, an electronic control unit (ECU), which includes the preceding vehicle position determining apparatus, according to the present invention is connected to at least a positional signal receiving unit, a communication unit, an autonomous sensor, an assistance device, and an output device.

First, as illustrated in FIG. 1, the ECU acquires relative position information related to the relative position between a host vehicle and another vehicle traveling ahead of the host vehicle, and error information related to an error in the relative position (step SA-1).

Then, the ECU detects the position of the preceding vehicle traveling in front of the host vehicle (step SA-2).

The ECU identifies the position of the preceding vehicle, by comparing the relative position based on the relative position information acquired in step SA-1, with the position of the preceding vehicle detected in step SA-2 (step SA-3). At this time, if relative position information on a plurality of other vehicles is acquired in step SA-1, the ECU may identify the position of the preceding vehicle by comparing the relative position based on the relative position information acquired in step SA-1, with the position of the preceding vehicle detected in step SA-2, by using a threshold that is varied in accordance with the error information acquired in step SA-1.

Referring to FIG. 2, an example of a preceding vehicle identification process according to this embodiment will be described. FIG. 2 is a flowchart that illustrates an example of the preceding vehicle identifying process according to this embodiment.

As illustrated in FIG. 2, if relative position information on a plurality of other vehicles is acquired, in other words, if potentially confusing preceding vehicles are present in identifying a preceding vehicle (whose error circles based on error information overlap each other), the ECU compares the distances and relative velocities between the host vehicle and these other vehicles (step SB-1).

Now, referring to FIG. 3, an example of error circles according to this embodiment will be described. FIG. 3 is a diagram that illustrates an example of error circles according to this embodiment.

Figure 3:
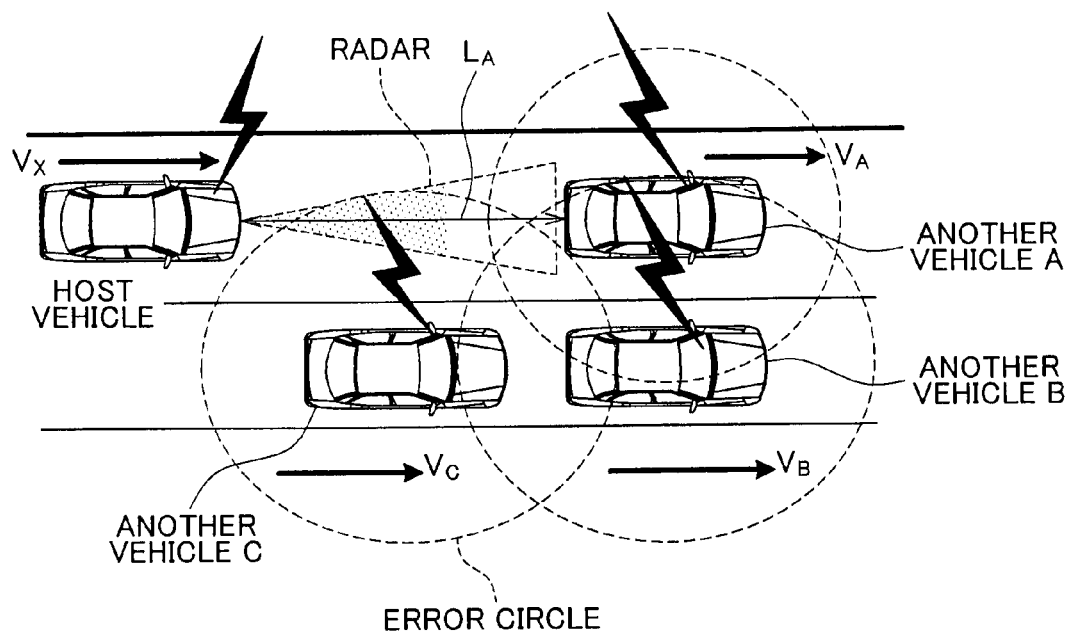
FIG. 3 is a diagram that illustrates an example of error circles according to this embodiment.

As shown in FIG. 3, an error circle is represented by the region within the range indicated by dotted lines around each of another vehicle A, another vehicle B, and another vehicle C. In acquiring the positional information (for example, coordinates, azimuth, and velocity (such as $V_X$, $V_A$, $V_B$, and $V_C$))

of a vehicle based on a GPS signal, errors may occur between the acquired positional information and the actual object's position information due to various factors. Accordingly, an error circle is indicated as a tolerance range which takes this error into consideration and within which a vehicle can exist (for example, a range within which the vehicle is likely to exist). Causes of error in GPS positioning include the influence of ionosphere, influence of water vapor, influence of atmosphere, influence of satellite's arrangement, influence of high voltage transmission lines, influence of thunder, and multi-path.

Returning to FIG. 2, the ECU lowers the threshold, and verifies a match between the relative position based on relative position information, and the position of the preceding vehicle traveling in front of the host vehicle which is detected by the autonomous sensor (radar) (step SB-2).

Then, the ECU identifies (determines) the preceding vehicle (step SB-3).

This concludes the overview of the present invention.

Figure 4:
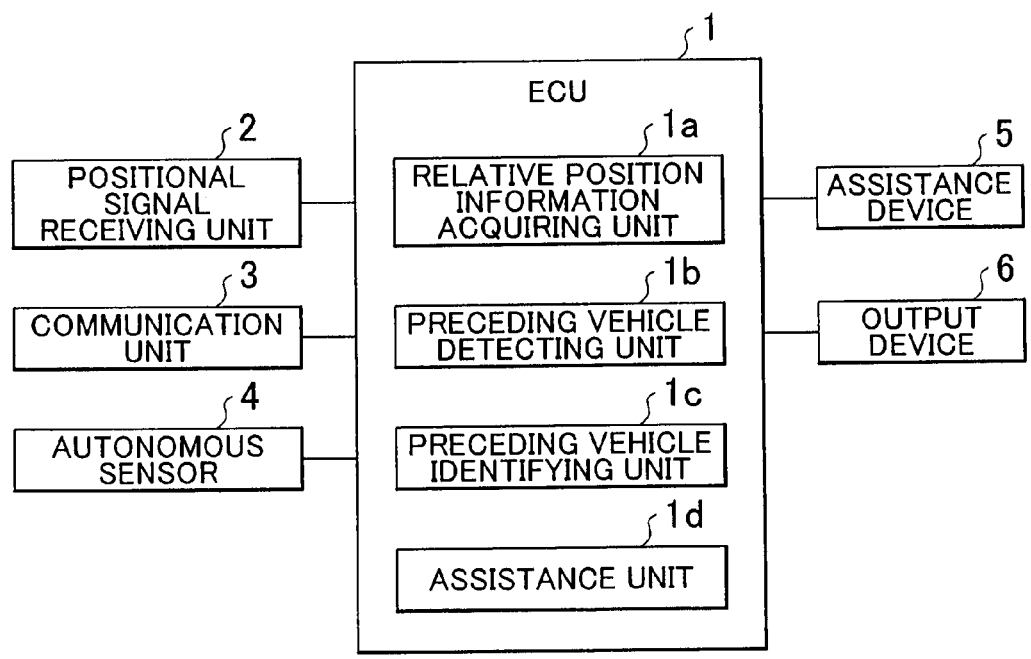
FIG. 4 is a block diagram that illustrates an example of configuration of an ECU according to this embodiment.

The configuration of the electronic control unit (ECU) according to this embodiment will be described with reference to FIG. 4. FIG. 4 is a block diagram that illustrates an example of the configuration of the ECU according to this embodiment.

In FIG. 4, reference numeral 1 denotes the ECU (including the preceding vehicle position determining apparatus according to the present invention). Reference numeral 2 denotes a positional signal receiving unit that receives a signal used for position measurement such as a GPS signal, which is transmitted from an external system. Reference numeral 3 denotes a communication unit that transmits and receives data, such as positional information, to and from another vehicle or the like. Reference numeral 4 denotes an autonomous sensor that includes a millimeter-wave radar, a laser radar, or the like, which measures the distance between the host vehicle and another vehicle, and also measures the velocity of the other vehicle. Reference numeral 5 denotes an assistance device that controls vehicle's drive force, braking force, steering force, and the like. Reference numeral 6 denotes an output device, such as a display device like a liquid crystal monitor, and an audio output device like a speaker. In FIG. 4, reference numeral 1a denotes a relative position information acquiring unit, reference numeral 1b denotes a preceding vehicle detecting unit, reference numeral 1c denotes a preceding vehicle identifying unit, and reference numeral 1d denotes an assistance unit.

The relative position information acquiring unit 1a acquires relative position information related to the relative position between a host vehicle and another vehicle traveling in front of the host vehicle, and error information related to an error in the relative position. At this time, the relative position information acquiring unit 1a may calculate positional information on the host vehicle from a GPS signal detected by the positional signal receiving unit 2, acquire positional information on another vehicle received by the communication unit 3, and acquire information on the relative position between the host vehicle and the other vehicle on the basis of the positional information on the host vehicle and the positional information on the other vehicle. At this time, the communication unit 3 may receive positional information transmitted from another vehicle, or may receive positional information transmitted from a base station or the like that receives positional information and the like transmitted from a vehicle.

The preceding vehicle detecting unit 1b detects the position of the preceding vehicle traveling in front of the host vehicle. At this time, the preceding vehicle detecting unit 1b may detect the position of the preceding vehicle traveling in front of the host vehicle on the basis of the distance to another vehicle and the velocity of the other vehicle which are detected by the autonomous sensor 4.

The preceding vehicle identifying unit 1c identifies the position of the preceding vehicle by comparing the relative position based on the relative position information acquired by the relative position information acquiring unit 1a, with the position of the preceding vehicle detected by the preceding vehicle detecting unit 1b. At this time, if relative position information on a plurality of other vehicles is acquired by the relative position information acquiring unit 1a, the preceding vehicle identifying unit 1c may determine the position of the preceding vehicle by comparing the relative position based on the relative position information acquired by the relative position information acquiring unit 1a, with the position of the preceding vehicle detected by the preceding vehicle detecting unit 1b, by using a threshold that is varied in accordance with the error information related to an error in the relative position acquired by the relative position information acquiring unit 1a. In addition, the threshold may be lowered as the error based on the error information increases.

The assistance unit 1d provides driving assistance to the driver. In particular, the assistance unit 1d may provide driving assistance to the driver by controlling the assistance device 5 (for example, an actuator to control vehicle velocity, travel direction, and the like, in order to make the host vehicle execute appropriate traveling (for example, evasive action) with respect to the other vehicle identified by the preceding vehicle identifying unit 1c. The assistance unit 1d may provide driving assistance to the driver by controlling the output device 6 to present display data related to the other vehicle identified by the preceding vehicle identifying unit 1c. In addition, the assistance unit 1d may provide driving assistance to the driver by controlling the output device 6 to present audio data, such as a warning related to the other vehicle identified by the preceding vehicle identifying unit 1c.

This concludes the description of the configuration of the present invention.

Figure 5:
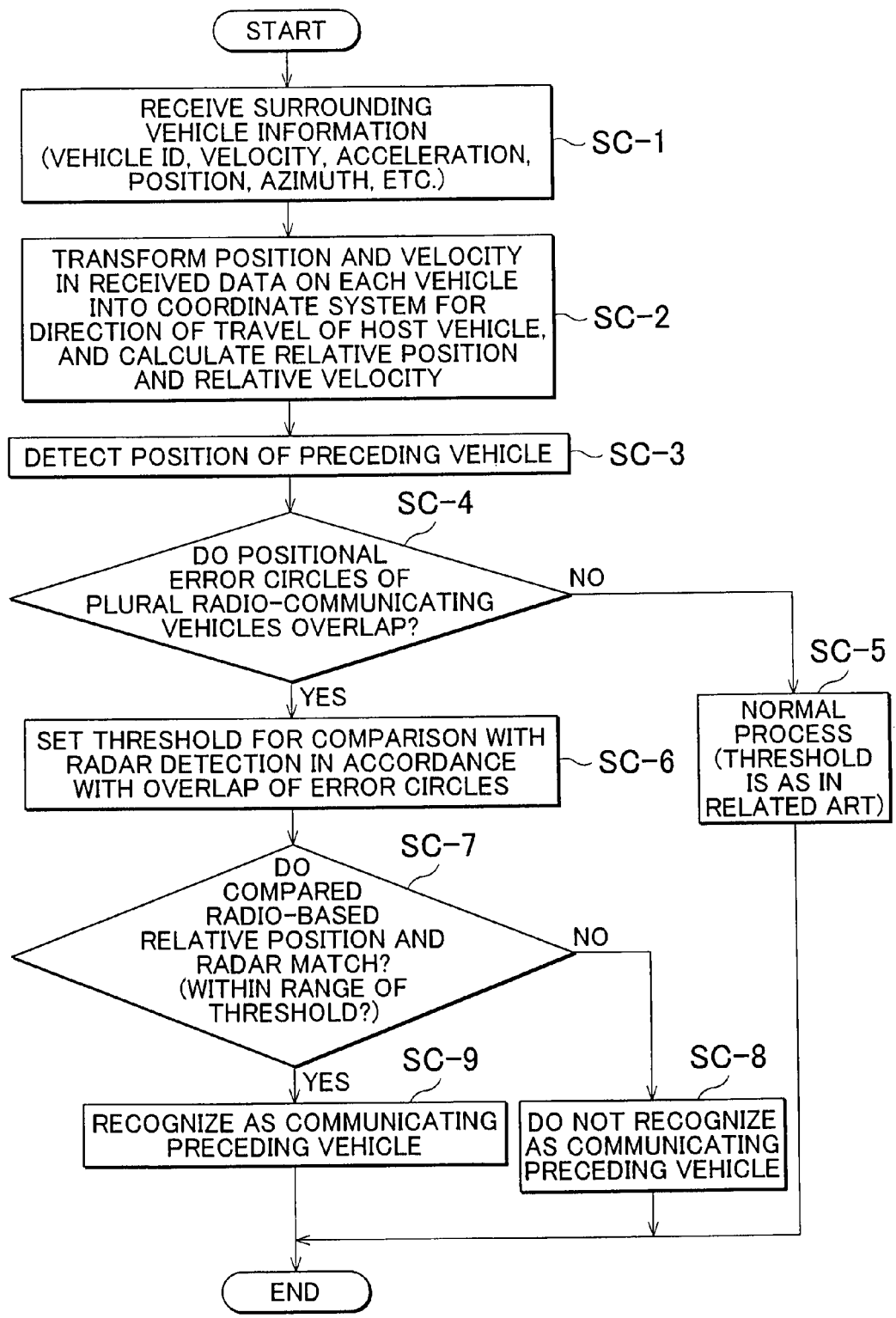
FIG. 5 is a flowchart that illustrates an example of processing of a preceding vehicle determining apparatus according to this embodiment.

Next, an example of process executed by the preceding vehicle position determining apparatus, which is executed by the ECU 1 configured as described above, will be described with reference to FIG. 3 and FIG. 5. FIG. 5 is a flowchart that illustrates an example of the processes of the preceding vehicle position determining apparatus according to this embodiment.

As illustrated in FIG. 5, the ECU 1 acquires information (for example, surrounding vehicle information such as vehicle ID, velocity, acceleration, position, and azimuth) on another vehicle (surrounding vehicle) received by the communication unit 3 by radio communication (step SC-1).

The relative position information acquiring unit 1a calculates positional information on a host vehicle from a GPS signal detected by the positional signal receiving unit 2. Next, the relative position information acquiring unit 1a transforms the position and velocity of each surrounding vehicle based on the surrounding vehicle information (received data on each vehicle) acquired by the ECU 1 in step SC-1, into a coordinate system for the direction of travel of the host vehicle, and computes relative position and relative velocity by using the calculated positional information on the host vehicle, thereby acquiring information on the relative position between the host vehicle and the other vehicle (step SC-2).

Then, the preceding vehicle detecting unit 1b detects the position of the preceding vehicle that is another vehicle traveling in front of the host vehicle, on the basis of the distance to another vehicle and the velocity of the another vehicle which are detected by the autonomous sensor 4 (step SC-3).

Next, referring to FIG. 3, an example of how the position of a preceding vehicle is detected by the autonomous sensor 4 according to this embodiment will be described.

As illustrated in FIG. 3, the autonomous sensor (on-vehicle radar device) 4 emits radar forward from the host vehicle, and receives the wave (radio waves, infrared radiation, or the like) reflected from another vehicle A, thereby detecting the distance $L_A$ between the host vehicle and another vehicle A, and the velocity $V_A$ of another vehicle A, or the relative velocity or the like between the velocity $V_X$ of the host vehicle and the velocity $V_A$ of another vehicle A.

Returning to FIG. 5, based on the error in relative position between the host vehicle and the plurality of other vehicles (radio-communicating vehicles) traveling ahead of the host vehicle, the preceding vehicle identifying unit 1*c* determines whether or not the positional error circles of the plurality of radio-communicating vehicles overlap (step SC-4).

If it is determined in step SC-4 that the positional error circles of the plurality of radio-communicating vehicles traveling ahead of the host vehicle do not overlap (step SC-4: No), the preceding vehicle identifying unit 1*c* compares the relative position based on the relative position information acquired by the relative position information acquiring unit 1*a* in step SC-2, with the position of the preceding vehicle detected by the preceding vehicle detecting unit 1*b* in step SC-3, by using a preset threshold that is used in a normal process in the related art, thereby identifying the position of the preceding vehicle (the radio-communicating vehicle that is traveling in front of the host vehicle among the plurality of vehicles traveling ahead of the host vehicle) (step SC-5), and ends processing.

However, if it is determined in step SC-4 that the positional error circles of the plurality of radio-communicating vehicles traveling ahead of the host vehicle overlap (step SC-4: Yes), a threshold for determining whether the relative position based on the relative position information matches the position of the preceding vehicle detected by the radar is set in accordance with the overlap of the error circles (step SC-6). At this time, the preceding vehicle identifying unit 1*c* may lower the threshold as the error increases.

Then, the preceding vehicle identifying unit 1*c* compares the relative position (radio-based relative position) based on the relative position information acquired by the relative position information acquiring unit 1*a* in step SC-2, with the position of the preceding vehicle (position detected by using radar) detected by the preceding vehicle detecting unit 1*b* in step SC-3, by using the threshold set in step SC-6, and determines whether the two positions match (within the range of the threshold) (step SC-7).

If the preceding vehicle identifying unit 1*c* determines that the relative position based on the relative position information acquired by the relative position information acquiring unit 1*a*, and the position of the preceding vehicle detected by the preceding vehicle detecting unit 1*b* do not match (step SC-7: No), the preceding vehicle identifying unit 1*c* does not recognize the corresponding vehicle as a communicating preceding vehicle (step SC-8), and ends processing.

If the preceding vehicle identifying unit 1*c* determines that the relative position based on the relative position information acquired by the relative position information acquiring unit 1*a*, and the position of the preceding vehicle detected by the preceding vehicle detecting unit 1*b* match (step SC-7: Yes), the preceding vehicle identifying unit 1*c* recognizes the corresponding vehicle as a communicating preceding vehicle, identifies the position of the preceding vehicle (step SC-9), and ends processing.

This concludes the description of operation according to the present invention.

As described above, this embodiment includes relative position information acquiring means for acquiring relative position information related to a relative position between a host vehicle and another vehicle that is traveling ahead of the host vehicle, and error information related to an error in the relative position, preceding vehicle detecting means for detecting a position of a preceding vehicle that is traveling in front of the host vehicle, and preceding vehicle identifying means for identifying the position of the preceding vehicle, by comparing the relative position based on the relative position information acquired by the relative position information acquiring means, with the position detected by the preceding vehicle detecting means. If the relative position information on a plurality of the vehicles is acquired by the relative position information acquiring means, the preceding vehicle identifying means identifies the position of the preceding vehicle by comparing the relative position based on the relative position information acquired by the relative position information acquiring means, with the position detected by the preceding vehicle detecting means, by using a threshold varied in accordance with the error information. In other words, in this embodiment, a communicating preceding vehicle is constantly detected, and when there are a plurality of communicating vehicles nearby, and their error circles overlap, in order to prevent those vehicles from being erroneously determined as preceding vehicles, the threshold for comparison between the relative position between the host vehicle and the plurality of communicating vehicles based on the relative position information, and the position of another vehicle detected by using the autonomous sensor is made smaller for more precise comparison and match determination, thereby identifying the preceding vehicle. This makes it possible to reduce the possibility of a nearby communicating vehicle not subject to comparison being erroneously recognized as a preceding vehicle, which occurs in the case when a preceding vehicle is identified by comparison between the inter-vehicle relative position and the position of the preceding vehicle detected by using radar, without taking the presence of such a nearby communicating vehicle into consideration.

Also, for example, in vehicle identification techniques according to the related art that directly identify the vehicle being detected from among communication data on a plurality of vehicles, the difference between a change in the integral of velocity (movement) of each vehicle (differential of movement), and the integral of change in following distance based on an autonomous sensor such as radar is calculated to determine the change in vehicle behavior in a time-series fashion, thereby identifying a vehicle. However, because this embodiment does not simply compare the value obtained by integrating and differentiating the difference in velocity (relative velocity) detected by radio, with the value obtained by integrating and differentiating the relative velocity to the preceding vehicle detected by radar in a time-series fashion, the determination time can be reduced, and the range of application can be also broadened. Also, according to this embodiment, in actual traffic environments, in particular, places where many vehicles are traveling at the same velocity such as expressway, determination of the preceding vehicle is not performed solely on the basis of velocity, and thus a single vehicle can be identified efficiently.

Furthermore, in this embodiment, the threshold is lowered as the error based on error information increases. Thus, by decreasing the threshold for comparison as the error in GPS-based positional information increases, the determination criterion is made more stringent to facilitate more precise identification of the preceding vehicle.

As described above, the preceding vehicle position determining apparatus according to the present invention is useful in the automobile manufacturing industry, and is particularly suited to execute hazard evasive control for a vehicle based on a technique for recognizing objects that are present in the vicinity of the vehicle, or the like.

The present invention may also be applied to adaptive cruise control, and when the object sensor is normal but an abnormality in communication continues, the adaptive cruise control based on the recognition result may be either stopped or continued.

While the invention has been described with reference to example embodiments thereof, it is to be understood that the invention is not restricted to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

The invention claimed is:

1. An on-vehicle apparatus, comprising:
   an object sensor that detects a first position of a second vehicle preceding a host vehicle;
   an acquiring device that acquires a second position of the second vehicle by communication; and
   a controller that (i) compares a difference between the first position and the second position with a threshold to recognize a positional relationship between the host vehicle and the second vehicle, (ii) changes the threshold on the basis of error information related to an error in the relative position between the host vehicle and the second vehicle, and (iii) lowers the threshold if it determines that a tolerance range of the relative position between the host vehicle and the second vehicle overlaps a tolerance range of a relative position between the host vehicle and at least a third vehicle preceding the host vehicle, each of the tolerance ranges indicating a range within which the respective vehicles preceding the host vehicle are likely to exist.

2. The on-vehicle apparatus according to claim 1, wherein:
   the on-vehicle apparatus is applied to adaptive cruise control;
   if the object sensor is abnormal, even if communication is normal, the adaptive cruise control based on a result of recognition of the positional relationship is continued; and
   if the object sensor is normal, and an abnormality in communication continues, the adaptive cruise control is stopped.

3. The on-vehicle apparatus according to claim 1, wherein:
   the object sensor is at least one of a millimeter-wave radar, a laser radar, a camera, an ultra wide band radar, and a sonar.

4. A preceding vehicle position determining apparatus comprising:
   a relative position information acquiring device that acquires relative position information related to a relative position between a host vehicle and a second vehicle that is traveling ahead of the host vehicle, and error information related to an error in the relative position, via communication;
   a preceding vehicle detecting device that detects a position of each of a plurality of vehicles, including the position of the second vehicle; and
   a preceding vehicle identifying device that (i) identifies the position of the second vehicle, by comparing the relative position based on the relative position information acquired by the relative position information acquiring device, with the position detected by the preceding vehicle position detecting device, by using a threshold varied in accordance with the error information, and (ii) lowers the threshold if it determines that a tolerance range of the relative position between the host vehicle and the second vehicle overlaps a tolerance range of a relative position between the host vehicle and any other vehicle in the plurality of vehicles, each of the tolerance ranges indicating a range within which the respective vehicles are likely to exist.

5. A method of identifying a preceding vehicle, comprising:
   acquiring relative position information related to a relative position between a host vehicle and second vehicle that is traveling ahead of the host vehicle, and error information related to an error in the relative position, via a communication device;
   detecting a position of each of a plurality of vehicles, including the position of the second vehicle;
   identifying the position of the second vehicle by using a processor to compare the relative position information with the detected position, and by using a threshold varied in accordance with the error information; and
   lowering the threshold if a tolerance range of the relative position between the host vehicle and the second vehicle overlaps a tolerance range of a relative position between the host vehicle and any other vehicle in the plurality of vehicles, each of the tolerance ranges indicating a range within which the respective vehicles are likely to exist.

* * * * *